US00RE45683E

(19) United States
(12) Reissued Patent
Nomura et al.

(10) Patent Number: US RE45,683 E
(45) Date of Reissued Patent: Sep. 29, 2015

(54) PRINTING DEVICE

(71) Applicant: Kabushiki Kaisha Toshiba, Minato-ku (JP)

(72) Inventors: Yuko Nomura, Kanagawa-ken (JP); Yasuharu Hosono, Kanagawa-ken (JP); Isao Amemiya, Tokyo (JP)

(73) Assignee: KABUSHIKI KAISHA TOSHIBA, Minato-ku (JP)

(21) Appl. No.: 14/290,416

(22) Filed: May 29, 2014

Related U.S. Patent Documents

Reissue of:

(64) Patent No.: 8,628,167
Issued: Jan. 14, 2014
Appl. No.: 13/395,482
PCT Filed: Sep. 14, 2009
PCT No.: PCT/JP2009/065994
§ 371 (c)(1),
(2) Date: Mar. 12, 2012
PCT Pub. No.: WO2011/030452
PCT Pub. Date: Mar. 17, 2011

(51) Int. Cl.
*B41J 2/015* (2006.01)
*B41J 2/14* (2006.01)
*B41J 2/005* (2006.01)

(52) U.S. Cl.
CPC ..... *B41J 2/14008* (2013.01); *B41J 2/0057* (2013.01)

(58) Field of Classification Search
CPC ..... B41J 2/14008; B41J 2/0057
USPC ..... 347/20
See application file for complete search history.

(56) References Cited

U.S. PATENT DOCUMENTS

| | | | | | |
|---|---|---|---|---|---|
| 5,121,141 | A * | 6/1992 | Hadimoglu et al. | 347/46 |
| 5,155,504 | A * | 10/1992 | Oikawa | 347/66 |
| 5,339,101 | A * | 8/1994 | Rawson et al. | 347/46 |
| 5,565,113 | A * | 10/1996 | Hadimioglu et al. | 216/2 |
| 5,686,945 | A * | 11/1997 | Quate et al. | 347/46 |
| 6,134,291 | A * | 10/2000 | Roy et al. | 377/46 |
| 6,642,061 | B2 * | 11/2003 | Ellson et al. | 436/180 |
| 7,611,230 | B2 * | 11/2009 | Nomura et al. | 347/68 |
| 7,997,694 | B2 | 8/2011 | Nomura et al. | |
| 2008/0088668 | A1 | 4/2008 | Nomura et al. | |

FOREIGN PATENT DOCUMENTS

| | | |
|---|---|---|
| JP | 63 166547 | 7/1988 |
| JP | 6 238884 | 8/1994 |

(Continued)

OTHER PUBLICATIONS

Office Action issued Jul. 21, 2014 in Chinese Patent Application No. 200980161417.3 (with English translation).

(Continued)

*Primary Examiner* — Michael J. Yigdall
(74) *Attorney, Agent, or Firm* — Oblon, McClelland, Maier & Neustadt, L.L.P.

(57) ABSTRACT

There is provided a printing device configured to eject a dispersed body containing a solid particle and a liquid. The printing device includes a film and an acoustic head. The film has a first major surface and a second major surface on an opposite side of the first major surface. The first major surface is provided with a first recess accommodating the liquid and a second recess provided on a bottom face of the first recess and accommodating the solid particle. The acoustic head focuses an acoustic wave from a side of the second major surface toward the first recess and the second recess. Thus, even in the case of discharging a dispersed body containing solid particles, it is possible to uniformize the amount of solid particles contained in ejected droplets and it is possible to uniformly make a print.

5 Claims, 4 Drawing Sheets

(56) References Cited

FOREIGN PATENT DOCUMENTS

| | | |
|---|---|---|
| JP | 2007 83160 | 4/2007 |
| JP | 2008 105396 | 5/2008 |
| JP | 2009 83169 | 4/2009 |

OTHER PUBLICATIONS

Office Action issued Dec. 29, 2014 in Chinese Patent Application No. 200980161417.3 (with English language translation).

Japanese Office Action issued Jan. 10, 2013 in Patent Application No. 2011-530709 with English Translation.

Office Action issued Aug. 26, 2013, in Korean Patent Application No. 10-2012-7006581 with English translation.

Elrod, S.A., "Nozzleless droplet formation with focused acoustic beams," Journal of Applied Physics, vol. 65, No. 9, pp. 3441-3447, (May 1, 1989).

International Search Report Issued Oct. 20, 2009 in PCT/JP09/65994 Filed Sep. 14, 2009.

* cited by examiner

PRINTING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present reissue application is a reissue application of U.S. Pat. No. 8,628,167, issued on Jan. 14, 2014.*

TECHNICAL FIELD

This invention relates to a printing device.

BACKGROUND ART

A printing device that jets a liquid in small droplets and deposits the droplets on a substrate is known as an ink jet printing device, for example. Such a printing device is widening the use range not only to printing pictures on a paper sheet, but also to industrial fields such as coating a liquid electronic material and direct patterning.

Patent Document 1 discloses an ink jet recording device in a configuration in which an acoustic wave is focused on a film applied with ink. In this technique, nozzles are not clogged because the technique uses no nozzles, and the restrictions on ink characteristics are relaxed. In such an ink jet printing device, it is expected to further improve variations in the amount of solid particles in ejected droplets as in the case of using ink (a dispersed body) containing solid particles in particular.

CITATION LIST

Patent Literature

[PTL1]
JP 2008-105396 A (Kokai)

SUMMARY OF INVENTION

Technical Problem

The invention is to provide a printing device that can uniformize the amount of solid particles contained in ejected droplets and uniformly make a print in the case of discharging a dispersed body containing solid particles.

Solution to Problem

According to an aspect of the invention, there is provided a printing device configured to eject a dispersed body containing a solid particle and a liquid, comprising: a film having: a first major surface; and a second major surface on an opposite side of the first major surface, the first major surface being provided with: a first recess accommodating the liquid; and a second recess provided on a bottom face of the first recess and accommodating the solid particle; and an acoustic head configured to focus an acoustic wave from a side of the second major surface toward the first recess and the second recess.

Advantageous Effects of Invention

According to the invention, there is provided a printing device that can uniformize the amount of solid particles contained in ejected droplets and uniformly make a print in the case of discharging a dispersed body containing solid particles.

DESCRIPTION OF EMBODIMENTS

Figure 1A:
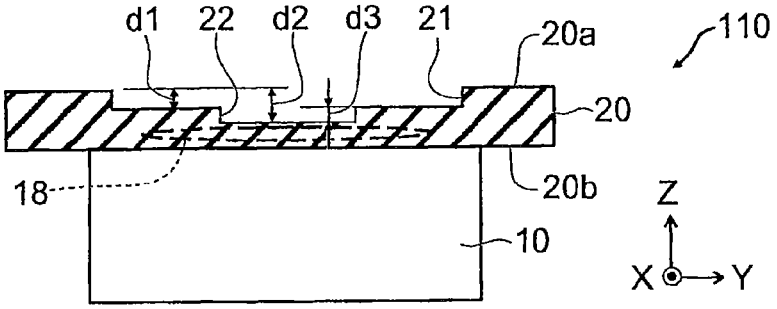
FIGS. 1A to 1C are schematic views showing a printing device.

In the following, an embodiment of the invention will be described in detail with reference to the drawings.

The drawings are schematic or conceptual; and the relationships between the thickness and width of portions, the proportional coefficients of sizes among portions, etc., are not necessarily the same as the actual values thereof.

Further, the dimensions and ratios may be illustrated differently among drawings, even for identical portions.

In the specification and drawings, components similar to those described or illustrated in a drawing thereinabove are marked with like reference numerals, and a detailed description is omitted as appropriate.

Embodiment

Figure 1B:
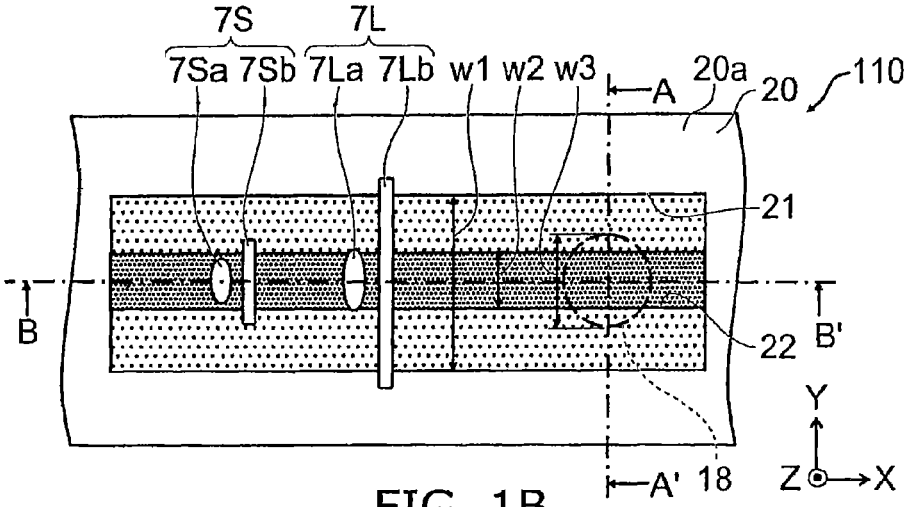
Figure 1C:
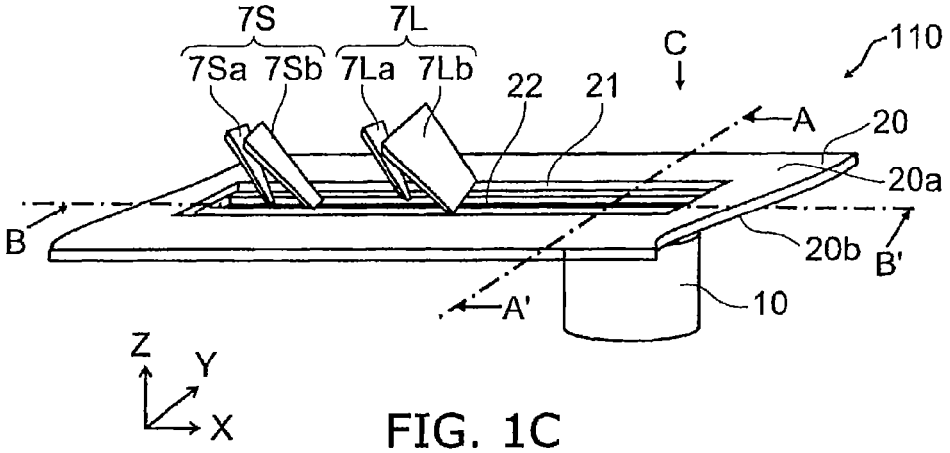

FIGS. 1A to 1C are schematic views illustrating the configuration of a printing device according to an embodiment of the invention.

Namely, FIG. 1C is a schematic perspective view, FIG. 1A is a cross-sectional view on a line A-A' shown in FIG. 1C, and FIG. 1B is a schematic plan view seen from the direction of an arrow C in FIG. 1(c).

Figure 2A:
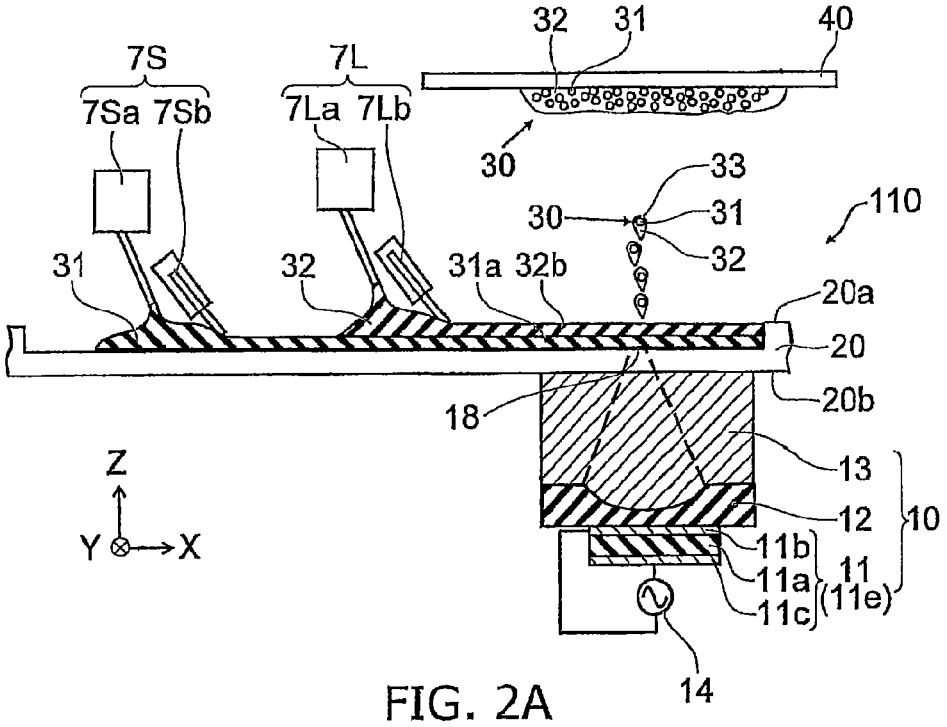
FIGS. 2A and 2B are schematic cross-sectional views showing the operation of the printing device.
Figure 2B:
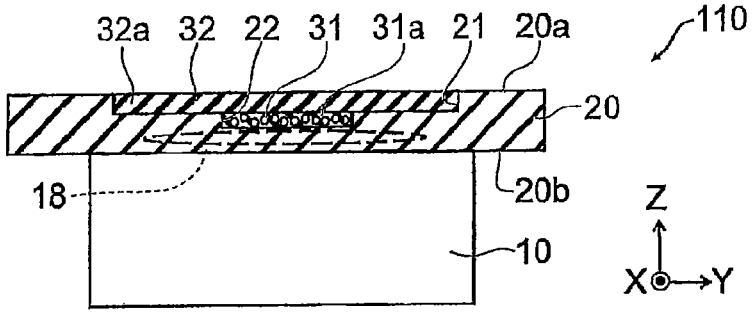

FIGS. 2A and 2B are schematic cross-sectional views illustrating the operation of the printing device according to the embodiment of the invention.

Namely, FIG. 2A is a cross-sectional view on a line B-B' in FIG. 1C. FIG. 2A also illustrates a material to be printed 40 onto which a dispersed body 30 is deposited using a printing device 110. FIG. 2B is a schematic view illustrating the disposition state of solid particles 31 and a liquid 32 of the dispersed body 30 on a film 20, which is a schematic cross sectional view corresponding to FIG. 1A.

As illustrated in FIG. 1A to FIG. 2C, the printing device 110 according to the embodiment is a printing device that ejects the dispersed body 30 containing the solid particles 31 and the liquid 32.

The printing device 110 includes the film 20 and an acoustic head 10.

The film 20 has a first major surface 20a and a second major surface 20b on the opposite side of the first major surface 20a.

The first major surface 20a is provided with a first recess 21 and a second recess 22. The second recess 22 is provided on the bottom face of the first recess 21. A depth d2 of the second recess 22 seen from the first major surface 20a is deeper than a depth d1 of the first recess 21. Namely, the distance (the depth d2) between the first major surface 20a and the bottom face of the second recess 22 is longer than the distance (the depth d1) between the first major surface 20a and the bottom face of the first recess 21. Here, a depth d3 of the second recess 22 seen from the bottom face of the first recess 21 is a difference between the depth d2 and the depth d1, i.e. (d2–d1).

The first recess 21 accommodates the liquid 32 that is a part of the dispersed body 30.

The second recess 22 accommodates the solid particles 31 that are the other part of the dispersed body 30.

The acoustic head 10 focuses an acoustic wave from the surface side of the second major surface 20b of the film 20 toward the first recess 21 and the second recess 22. More specifically, the acoustic head 10 focuses the generated acoustic wave from the surface side of the second major surface 20b of the film 20 toward the first recess 21 and the second recess 22. For example, the acoustic wave is focused on an acoustic wave focusing region 18 on the first major surface 20a side including the first recess 21 and the second recess 22.

For the solid particles 31, given solid particles can be used including conductive particles such as metal, semiconductor particles, inorganic conductive or insulating particles, organic conductive or insulating particles, colored particles such as various pigments, and various fluorescent particles.

On the other hand, for the liquid 32, given liquids can be used including a liquid containing various resins that remain as a binder after deposited on the material to be printed 40 as the dispersed body 30 together with the solid particles 31, for example, as well as various solvents that are substantially removed as by vaporization, for example, after deposited on the material to be printed 40 as the dispersed body 30 together with the solid particles 31. The liquid 32 has a function that efficiently transmits the acoustic wave generated and focused by the acoustic head 10 and efficiently ejects the solid particles 31 together with the solid particles 31 in the form of droplets 33 of the dispersed body 30.

The printing device 110 can further include a solid particle layer forming unit 7S and a liquid layer forming unit 7L.

The solid particle layer forming unit 7S disposes the solid particles 31 in the second recess 22 of the film 20.

The liquid layer forming unit 7L then disposes the liquid 32 in the first recess 21 of the film 20.

The solid particle layer forming unit 7S can have a solid particle supply unit 7Sa that supplies the solid particles 31 and a solid particle layer uniformizing unit 7Sb that uniformizes the thickness of a solid particle layer 31a of the solid particles 31 supplied by the solid particle supply unit 7Sa, for example. Various dispensers, for example, can be used for the solid particle supply unit 7Sa, and various scrapers or the like, for example, can be used for the solid particle layer uniformizing unit 7Sb.

The liquid layer forming unit 7L can have a liquid supply unit 7La that supplies the liquid 32 and a liquid layer uniformizing unit 7Lb that uniformizes the thickness of the liquid layer 32a of the liquid 32 supplied by the liquid supply unit 7La, for example. Various dispensers, for example, can also be used for the liquid supply unit 7La, and various scrapers or the like, for example, can also be used for the liquid layer uniformizing unit 7Lb.

The solid particle layer uniformizing unit 7Sb and the liquid layer uniformizing unit 7Lb may be omitted.

In the printing device 110, the pressure of the acoustic wave generated and focused by the acoustic head 10 forms meniscus on the surface of the dispersed body 30 that is a mixture of the solid particles 31 accommodated in the second recess 22 of the film 20 and the liquid 32 accommodated in the first recess 21, a part of the dispersed body 30 is separated as the droplets 33, the droplets 33 jet from the film 20 toward the material to be printed 40, and the dispersed body 30 is deposited on the material to be printed 40.

For example, the relative position between the film 20 and the acoustic head 10 is then changed within the plane parallel to the second major surface 20b. Thus, the acoustic wave is focused on the first recess 21 and the second recess 22 in different regions of the film 20, and new solid particles 31 and liquid 32 are sequentially formed in droplets 33 for discharging the dispersed body 30.

Here, for convenience of explanation, it is supposed that the film 20 is flat in a portion where the film 20 and the acoustic head 10 are faced to each other. The direction in which the relative position between the film 20 and the acoustic head 10 is changed is an X-axis direction (a first direction). Namely, the X-axis direction is parallel to the second major surface 20b. A direction parallel to the second major surface 206 and vertical to the X-axis direction is a Y-axis direction (a second direction). A direction vertical to the X-axis direction and the Y-axis direction is a Z-axis direction (a third direction). Namely, the film 20 and the acoustic head 10 are faced to each other along the Z-axis direction.

It is noted that the film 20 may be provided in an arc shape around the acoustic head 10, for example. Also in this case, in the central portion of the portion where the film 20 and the acoustic head 10 are faced to each other, the film 20 can be is considered to be substantially flat, and the above-mentioned X-, Y-, and Z-axis directions can be similarly defined.

In the specific example, the first recess 21 and the second recess 22 have a groove shape extending along the X-axis direction. However, the invention is not limited thereto. The shape and disposition of the first recess 21 and the second recess 22 are optional. In the following, the case will be explained where the first recess 21 and the second recess 22 have a groove shape extending along the X-axis direction.

In the printing device 110 according to the embodiment having such a configuration, since the solid particles 31 are accommodated in the second recess 22 of the film 20 and the liquid 32 is accommodated in the first recess 21, amounts of the solid particles 31 and the liquid 32 per unit area in the first major surface 20a of the film 20 are constant.

Namely, the volume of the second recess 22 per unit area is a volume (w2×(d2–d1)×unit length in the X-axis direction) based on a product of a width w2 of the second recess 22 along the Y-axis direction and the depth d3 of the second recess 22 seen from the bottom face of the first recess 21 (i.e. d2–d1), and the volume of the solid particles 31 accommodated in this space is made constant.

On the other hand, the volume of the first recess 21 per unit area is a volume (w1×d1×unit length in the X-axis direction) based on a product of a width w1 of the first recess 21 in the Y-axis direction and the depth d1 of the first recess 21 seen from the first major surface 20a, and the volume of the liquid 32 accommodated in this space is also made constant.

For this reason, the ratio between the solid particles 31 and the liquid 32 is made constant based on the shapes of the first recess 21 and the second recess 22. Thus, the concentration of the solid particles 31 in the dispersed body 30 having the solid particles 31 and the liquid 32 can be highly accurately controlled. Therefore, it is possible to eject the droplets 33 with a stable amount of the solid particles 31 in the dispersed body 30. As described above, according to the printing device 110, in the case of discharging a dispersed body containing solid particles, it is possible to uniformize the amount of solid particles contained in ejected droplets and implement uniform printing.

It is noted that the second recess 22 can accommodate the liquid 32 therein together with the solid particles 31. For example, when the solid particles 31 are disposed in the second recess 22 and then the liquid 32 is disposed in the first recess 21, the liquid 32 enters the first recess 21 as well as enters the space between the solid particles 31 in the second recess 22. In this entering, since a constant amount of the solid particles 31 is accommodated in the second recess 22, the volume of the liquid 31 accommodated in the second recess 22 is also made constant because the volume of the space between the solid particles 31 is also constant. As described above, also in the case where the liquid 32 is accommodated in the second recess 22, the ratio between the solid particles 31 and the liquid 32 is made constant based on the shapes of the first recess 21 and the second recess 22.

For example, in the case of a comparative example using a film having only one kind of recess, such a dispersed body 30 is used in which solid particles 31 and a liquid 32 are mixed with each other beforehand and the solid particles 31 are dispersed. In the case where such a dispersed body 30 is then disposed in a recess and an acoustic wave is generated and focused from an acoustic head 10 for discharging droplets 33, variations in the dispersion of the solid particles 31 in the dispersed body 30 cause an uneven concentration of the solid particles 31 contained in the droplets 33, and variations sometimes occur in the amount or dispersion of the solid particles 31 contained in the dispersed body 30 deposited on a material to be printed 40. Moreover, when the concentration of the solid particles 31 in the dispersed body 30 fluctuates, the damping amount of the acoustic wave transmitted through the dispersed body 30 fluctuates. Thus, energy necessary to eject the droplets 33 also fluctuates, which might be a cause of variations in discharging droplets. In the case where the dispersion of the solid particles 31 into the liquid 32 is poor, such variations become more noticeable, and fluctuations in the concentration of the solid particles 31 contained in the droplets 33 to be ejected are more increased. In addition to this, energy necessary in ejection fluctuates to lead to such cases where the splattering (burst), satellites, or the like of the droplets 33 occur because of excessive energy, and the droplets 33 are not ejected because of less energy.

On the contrary, in the printing device 110 according to the embodiment, the first recess 21 and the second recess 22 are provided on the film 20, so that the ratio between the solid particles 31 and the liquid 32 is made constant, the concentration of the solid particles 31 contained in the droplets 33 is made uniform, and energy necessary in ejection is also made constant. Thus, it is possible to also suppress the splattering (burst) and satellites of the droplets 33 and non-ejected droplets 33, and it is possible to implement a stable ejection of droplets in a uniform amount.

In the printing device 110, desirably, the solid particles 31 are accommodated in the second recess 22, and then the liquid 32 is accommodated in the first recess 21.

Namely, desirably, the solid particle layer forming unit 7S disposes the solid particles 31 in the second recess 22, and then the liquid layer forming unit 7L disposes the liquid 32 in the first recess 21.

Thus, the solid particles 31 can be reliably accommodated in the inside of the second recess 22, and the amount of the solid particles 31 can be made uniform per unit length in the X-axis direction. After reliably accommodating the solid particle 31 in the second recess 22, the liquid 32 is disposed in the first recess 21, so that the space of the first recess 21 is made constant, and the amount of the liquid 32 per unit length in the X-axis direction can also be made uniform. Therefore, it is possible to more highly accurately control the ratio between the solid particles 31 and the liquid 32.

It is noted that as illustrated in FIG. 2A, the acoustic head 10 of the printing device 110 according to the specific example can have an acoustic wave generating unit 11, an acoustic wave focusing unit 12, and an acoustic wave transmitting unit 13.

The acoustic wave generating unit 11 generates an acoustic wave. The acoustic wave focusing unit 12 focuses the acoustic wave generated at the acoustic wave generating unit 11 on an acoustic wave focusing position (namely, the acoustic wave focusing region 18). The acoustic wave transmitting unit 13 advances the acoustic wave toward the first recess 21 and the second recess 22 of the film 20.

For the acoustic wave generating unit 11, an acoustic element 11e can be used, which includes a pair of electrodes 11b and 11c and a piezoelectric element 11a provided therebetween. For the acoustic wave generating unit 11, a single disk-shaped acoustic element, for example, may be used, a plurality of acoustic elements arranged in a linear array may be used, or a plurality of acoustic elements arraigned in a two-dimensional array may be used.

For the piezoelectric element 11a, piezoelectric ceramics such as lead zirconate titanate (PZT), lead titanate, and barium titanate, a piezoelectric single crystal such as lithium niobate and lithium tantalate, a polymer piezoelectric element such as polyvinylidene fluoride (PVDF), and a piezoelectric semiconductor such as zinc oxide, for example, can be used.

A driver 14 that drives the acoustic wave generating unit 11 is connected to the pair of the electrodes 11b and 11c. The driver 14 applies a voltage to the piezoelectric element 11a based on an electric signal externally supplied. Thus, the acoustic wave is generated from the acoustic wave generating unit 11. The aforementioned electric signal includes signals based on various items of picture data or the like and signals based on patterns of the deposition shape of the dispersed body 30 to be ejected on the material to be printed 40.

The acoustic wave focusing unit 12 has a function that focuses the acoustic wave generated at the acoustic wave generating unit 11 on the acoustic wave focusing region 18, which is the acoustic wave focusing position. A concave lens, for example, made of glass can be used for the acoustic wave focusing unit 12. The concave lens is formed by polishing the major surface of a piece of disk-shaped glass, for example, in an arc shape. For the acoustic wave focusing unit 12, an inorganic material such as glass, an organic material such as epoxy resin, or the like can be used, for example. In addition, for the acoustic wave focusing unit 12, such a product can also be used that the surface of glass or resin is subjected to surface treatment to form a metal film, a metal oxide film, a nitride film, a polyolefin resin film, or the like for improving durability.

The acoustic wave transmitting unit 13 is a portion where the acoustic wave having been generated at the acoustic wave generating unit 11 and being focused at the acoustic wave focusing unit 12 is advancing. For the acoustic wave transmitting unit 13, such a product can be used that the space between the acoustic wave focusing unit 12 and the film 20 is filled with an acoustic wave transmitter. Preferably, the acoustic wave transmitter has a small acoustic wave damping; a liquid such as water, for example, can be preferably used.

As described above, the acoustic wave generated at the acoustic wave generating unit 11 is focused by the acoustic wave focusing unit 12, and focused on a predetermined acoustic wave focusing position through the acoustic wave transmitting unit 13. This acoustic wave focusing position is set in the acoustic wave focusing region 18 of the film 20 disposed as faced to the acoustic head 10. Namely, the film 20 is disposed at a position a predetermined distance apart from the acoustic wave focusing unit 12, for example, of the acoustic head 10, the acoustic wave is focused from the second major surface 20b side of the film 20 toward the first recess 21 to and the second recess 22, and the acoustic wave is focused on the acoustic wave focusing region 18, which is the acoustic wave focusing position.

The focal point of the acoustic wave emitted from the acoustic head 10 is formed on a predetermined acoustic wave focusing position (corresponding to the acoustic wave focusing region 18 of the film 20), and acoustic pressure distribution is generated at the acoustic wave focusing position. A beam width W of the acoustic wave near this focal point is expressed by $W=A1\cdot\lambda1\cdot F1/D1$, using a constant A1 for the shape of the acoustic wave generating unit 11, a wavelength λ1 of the acoustic wave, a focal length F1 of the acoustic wave, and a diameter D1. It is noted that the aforementioned constant A1 is 2.44 in the case where the shape of the acoustic wave generating unit 11 is a disk shape. In the case where the acoustic wave generating unit 11 is a disk shape, the beam width W of the acoustic wave is equivalent to the beam diameter of the acoustic wave.

A maximum acoustic pressure can be obtained within the range of the beam width W of the acoustic wave, whereas the acoustic pressure is decreased out of the range. When the surface of the liquid 32, for example, swells at the center of the focal point and the acoustic pressure exceeds the surface tension of the liquid 32, the droplet 33 containing the solid particles 31 and the liquid 32 is separated from the surface of the liquid 32, and the droplet 33 containing the solid particles 31 and the liquid 32 is ejected.

It is noted that for efficient transmission of the acoustic wave from the acoustic wave generating unit 11 to the acoustic wave transmitting unit 13, desirably, an acoustic impedance Zf of the acoustic wave focusing unit 12 is set to a value between an acoustic impedance ZP of the piezoelectric element 11a for use in the acoustic wave generating unit 11 and an acoustic impedance ZL of the acoustic wave transmitting unit 13. For example, more desirably, the acoustic impedance Zf of the acoustic wave focusing unit 12 is close to a geometric mean (i.e. $(ZP\cdot ZL)^{1/2}$) of the acoustic impedance ZP of the piezoelectric element 11a and the acoustic impedance ZL of the acoustic wave transmitting unit 13 for efficient transmission of the acoustic wave from the acoustic wave.

As already explained, the relative position between the film 20 and the acoustic head 10 is changed within the plane parallel to the second major surface 20b. Namely, the relative position between the film 20 and the acoustic head 10 is changed along the X-axis direction. For example, the position of the acoustic head 10 is fixed, and the position of the film 20 is changed along the X-axis direction. Moreover, for example, the position of the film 20 is fixed, and the position of the acoustic head 10 is changed along the X-axis direction. Furthermore, for example, the positions of both of the film 20 and the acoustic head 10 are changed, and the relative position between the film 20 and the acoustic head 10 is changed along the X-axis direction.

At this time, as illustrated in FIGS. 1A and 1B, desirably, the width w2 of the second recess 22 along the Y-axis direction is set smaller than a width w3 of the acoustic wave focusing region 18, on which the acoustic wave is focused on the first major surface 20a, along the Y-axis direction. It is noted that the width w3 is equivalent to the beam width W of the acoustic wave (namely, $A1\cdot\lambda1\cdot F1/D1$) as already explained.

Thus, it is possible to reduce energy necessary to form and separate the droplets 33. Although the acoustic pressure greatly fluctuates in a peripheral portion around the acoustic wave focusing region 18, the amount of the solid particles 31 corresponding to this peripheral portion can be reduced, so that it is possible to form the droplets 33 containing the solid particles 31 with excellent reproducibility in a uniform amount.

Namely, for example, in the case where the relative position between the acoustic head 10 and the film 20 is changed along the X-axis direction, the width w2 of the second recess 22 along the Y-axis direction is always disposed in the inside of the acoustic wave focusing region 18. Thus, a substantially uniform acoustic pressure is applied to all the solid particles 31, the droplets 33 containing a constant amount of the solid particles 31 can be ejected, and variations in the concentration of the solid particles 31 can be further suppressed.

Desirably, the width w1 of the first recess 21 along the Y-axis direction is set greater than the width w3 of the acoustic wave focusing region 18 along the Y-axis direction. Thus, for example, even in the case where the position of the acoustic wave focusing region 18 fluctuates along the Y-axis direction in some degree, the amount of the liquid 32 to be applied with an acoustic pressure is determined by the width w3 of the acoustic wave focusing region 18 along the Y-axis direction, so that the amount of the liquid 32 in the droplets 33 is made constant. Therefore, it is possible to eject the droplets 33 in more uniform concentration.

As described above, in the embodiment, a printing method is carried out, in which the acoustic wave is focused from the second major surface 20b side of the film 20 toward the first recess 21 and the second recess 22, whereby the dispersed body 30 containing the liquid and the solid particles 31 is ejected, the film 20 having the first major surface 20a including the first recess 21 having the liquid 32 accommodated in the first recess 21 and the second recess 22 provided on the bottom face of the first recess 21 and having the solid particles 31 accommodated in the second recess 22 and the second major surface 20b on the opposite side of the first major surface 20a. According to this printing method, in the case of discharging a dispersed body containing solid particles, it is possible to uniformize the amount of solid particles contained in ejected droplets, and it is possible to uniformly make a print.

Moreover, this printing method can include a process that the solid particles 31 are disposed in the second recess 22 and then the liquid 32 is disposed in the first recess 21. Thus, it is possible to more highly accurately control the ratio between the solid particles 31 and the liquid 32.

In the aforementioned printing device 110, the relative position between the film 20 and the acoustic head 10 is relatively changed along the one-dimensional X-axis direction, and the first recess 21 and the second recess 22 have a belt shape extending in the X-axis direction.

However, the invention is not limited thereto. The relative position between the film 20 and the acoustic head 10 may be two-dimensionally changed within the plane parallel to the second major surface 20b. In this case, the relative position between the film 20 and the acoustic head 10 can be relatively changed along both of the X-axis direction and the Y-axis direction, for example.

In this case, the first recess 21 and the second recess 22 can have a spot-like shape. Desirably, the width of the spot of the second recess 22 along the Y-axis direction is set smaller than the width of the acoustic wave focusing region 18 along the Y-axis direction, and the width of the spot of the second recess 22 along the X-axis direction is set smaller than the width of the acoustic wave focusing region 18 along the X-axis direction. Moreover, desirably, the width of the spot of the first recess 21 along the Y-axis direction is set larger than the width of the acoustic wave focusing region 18 along the Y-axis direction, and the width of the spot of the first recess 21 along the X-axis direction is set larger than the width of the acoustic wave focusing region 18 along the X-axis direction.

In the specific example, the film 20 is flat. However, the invention is not limited thereto. The shape of the film 20 is optional. Such a configuration may be possible in which the film 20 surrounds the acoustic head 10, for example, the film 20 has a cylindrical shape having a center axis in the Y-axis direction in a space including the acoustic head 10, for example, and the relative position between the film 20 and the acoustic head 10 is changed along the circumference of this cylinder.

Moreover, such a configuration may be possible in which the film 20 is provided in a wound shape in a roll, the film 20 extends from a first reel to a second reel, for example, and the film 20 and the acoustic head 10 are faced to each other at a position between the first reel and the second reel.

It is noted that the change in the relative position between the film 20 and the acoustic head 10 as described above is carried out by a driving unit, not shown.

Various resin films, for example, can be used for the film 20. More particularly, films can be used such as polyimide resin, polyamide resin, and polyester resin having high solvent resistance.

The thickness of the film 20 (the distance between the first major surface 20a and the second major surface 20b where the first recess 21 and the second recess 22 are not provided) is optional; the thickness can range from 10 μm to 300 μm or the like, for example. As described above, in the specification, the term "film" is not limited to having a thickness of 200 μm or less and a thickness of 10 mils (250 μm) or less, which has a given thickness and includes all of given film products that can hold the shape by themselves.

In order to efficiently transmit the acoustic wave passing through the film 20 to the solid particles 31 and the liquid 32, desirably, the thickness of the bottom face portion of the second recess 22 of the film 20 is thin to some extent, desirably, 100 μm or less, for example, and more desirably, about 50 μm. In order to maintain the mechanical strength of the film 20, desirably, the thickness of the film 20 is thick to some extent, and the thickness of the film 20 is desirably 15 μm or more. However, the thickness of the film 20 is appropriately set based on the depth d1 of the first recess 21, the depth d3 of the second recess 22, and so on, according to the diameter of the solid particles 31 for use and the ratio between the amount of the solid particles 31 and the amount of the liquid 32 for use, and so on.

The depth d3 of the second recess 22 seen from the bottom face of the first recess 21 can be a depth about two to three times the mean value of the diameter of the solid particles 31 for use. For example, in the case where the mean value of the diameter of the solid particles 31 is 15 μm, the depth d3 of the second recess 22 can be set ranging from about 20 μm to 50 μm.

The depth d1 of the first recess 21 seen from the first major surface 20a can be set ranging from 10 μm to 100 μm, for example.

The solid particles 31 can be disposed in the second recess 22 of the film 20 on demand.

The solid particle layer forming unit 7S and the liquid layer forming unit 7L that dispose the solid particles 31 and the liquid 32 in the second recess 22 and the first recess 21 of the film 20, respectively, may be disposed in separate components from the acoustic head 10. In this case, for example, such a configuration may be possible in which a film 20, which the solid particles 31 and the liquid 32 are disposed in the second recess 22 and the first recess 21 by the solid particle layer forming unit 7S and the liquid layer forming unit 7L, respectively, is first prepared, this film 20 is used to dispose the acoustic head 10 on the second major surface 20b side of the film 20, and an acoustic wave is focused toward the first recess 21 and the second recess 22 of the film 20. As described above, the solid particle layer forming unit 7S and the liquid layer forming unit 7L of the printing device 110 may be disposed at positions different from the acoustic head 10.

Preferably, the viscosity of the liquid 32 to be a part of the dispersed body 30 is a viscosity to an extent that the liquid 32 does not flow on the first major surface 20a of the film 20.

The wettability to the liquid 32 on the surface of the first major surface 20a is made different from the wettability to the liquid 32 on the surfaces of the side surface and the bottom face of the first recess 21, so that it is possible to suppress the overflow of the liquid 32 out of the first recess 21. Namely, this can suppress the flow of the liquid 32 on the first major surface 20a of the film 20. In this case, it is possible to relax demands for the viscosity of the liquid 32 for use.

The wettability to the liquid 32 on the surfaces of the side surface and the bottom face of the first recess 21 is made equal to the wettability to the liquid 32 on the surfaces of the side surface and the bottom face of the second recess 22. Thus, it is possible to promote the liquid 32 to enter the second recess 22, and it is possible to suppress the generation of an air layer to hamper transmission of an acoustic wave to the region around the solid particles 31 disposed in the second recess 22.

It is noted that metal, rubber, resin or the like having a small friction to the film 20 can be used for a scraper, for example, used for the solid particle layer uniformizing unit 7Sb and the liquid layer uniformizing unit 7Lb. Thus, it is possible to stabilize the operations of the solid particle layer forming unit 7S and the liquid layer forming unit 7L.

It is noted that the solid particles 31 can also be reused by collecting the solid particles 31 excessively supplied using the solid particle layer uniformizing unit 7Sb. Moreover, the liquid 32 can also be reused by collecting the liquid 32 excessively supplied using the liquid layer uniformizing unit 7Lb. In this collection, the collected solid particles 31 and the liquid 32 may be subjected to various processes such as stirring, addition of additives, filtration of agglomerates, and filtration of impurities, for example. A method of adding at least one of new solid particles 31 and new liquid 32 may be applied to the solid particles 31 and the liquid 32.

FIGS. 3A to 3D are schematic plan views illustrating the configuration of other printing devices according to the embodiment of the invention.

Namely, FIG. 3A to FIG. 3D illustrate the configuration of a film 20 in other printing devices 111 to 114 according to the embodiment, illustrating schematic plan views seen from a direction corresponding to the arrow C in FIG. 1C.

Figure 3A:
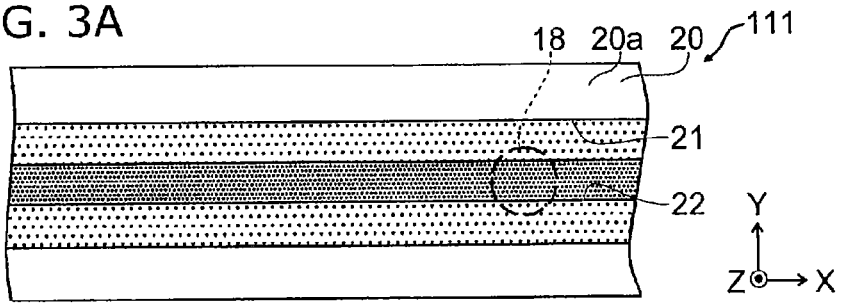
FIGS. 3A to 3D are schematic plan views showing another printing device.

As illustrated in FIG. 3A, in the printing device 111, a first recess 21 and a second recess 22 of the film 20 have a belt shape along the X-axis direction. Such a shape can be prepared by continuously forming grooves to be the first recess 21 and the second recess 22 on the film 20, in which the film 20 is shaped while applying a pressure to a material to be a base of the film 20 with a first projection and a second projection of a roller, using the roller having the first projection along the circumference of the roller and the second projection provided on the top of the first projection along the circumference, for example.

Figure 3B:
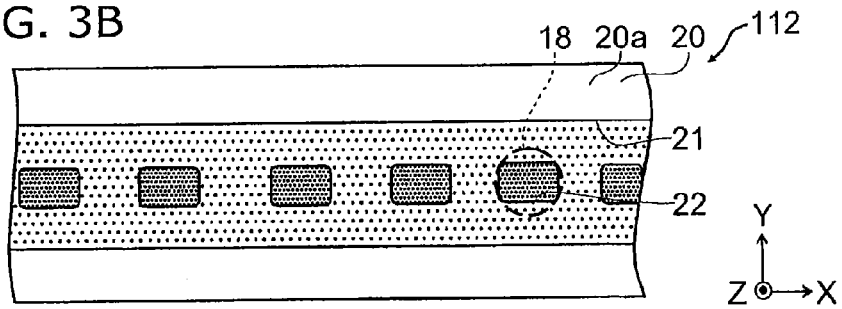
Figure 3C:
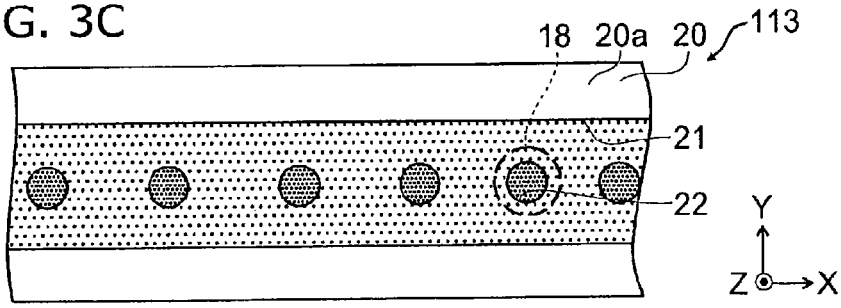

As illustrated in FIG. 3B and FIG. 3C, in the printing devices 112 and 113, although a first recess 21 of the film 20 has a belt shape along the X-axis direction, a second recess 22 is disposed on the bottom face of the first recess 21 in a discontinuous shape. In the printing device 112, the second recess 22 has a nearly square two-dimensional pattern shape, and in the printing device 113, the second recess 22 has a circular two-dimensional pattern shape. Such shapes can be prepared by forming the first recess 21 continuously and the second recess 22 discretely on the film 20, in which the film 20 is shaped while applying a pressure to a material to be a base of the film 20 with a first projection and a second projection of a roller, using the roller having the first projection along the circumference of the roller and the second projection provided discretely on the top of the first projection, for example.

Figure 3D:
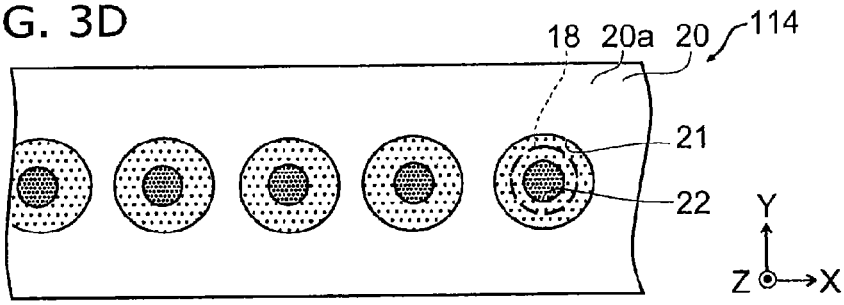

As illustrated in FIG. 3D, in the printing device 114, a first recess 21 and a second recess 22 of the film 20 are discontinuously disposed. Such a shape can be prepared by discretely forming the first recess 21 and the second recess 22 on the film 20, in which the film 20 is shaped while applying a pressure to a material to be a base of the film 20 with a first projection and a second projection of a roller, using the roller having the first projection discretely provided on the circumference of the roller and the second projection provide on the top of the first projection, for example.

In addition, also in the case of these printing devices 111 to 114, desirably, a width w2 of the second recess 22 along the Y-axis direction is set smaller than a width w3 of an acoustic wave focusing region 18 along the Y-axis direction. Desirably, a width w1 of the first recess 21 along the Y-axis direction is set greater than the width w3 of the acoustic wave focusing region 18 along the Y-axis direction.

Figure 4A:
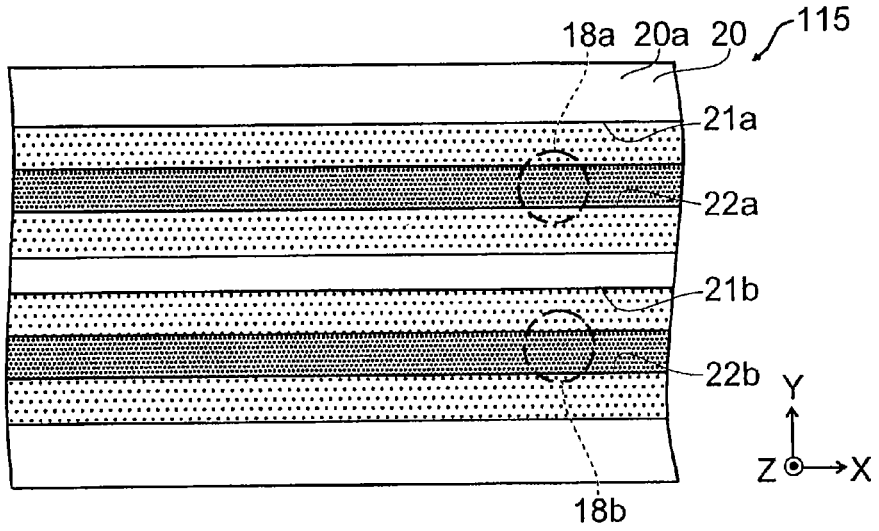
FIGS. 4A to 4B are schematic plan views showing another printing device.
Figure 4B:
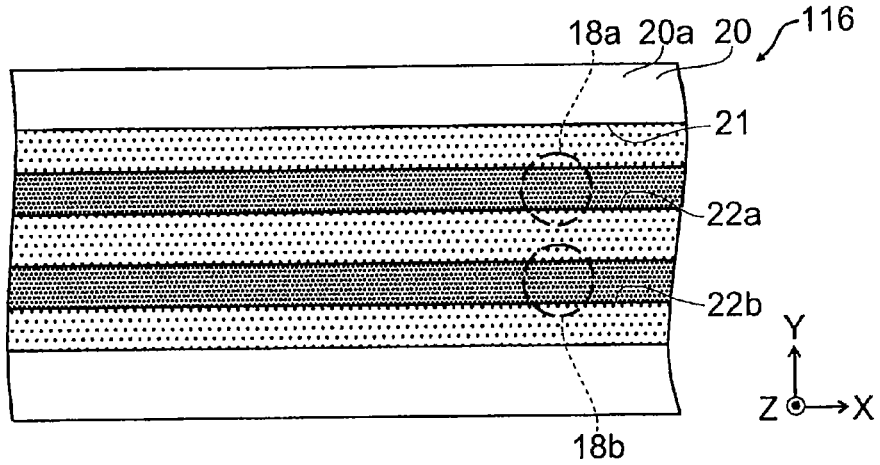

FIGS. 4A and 4B are schematic plan views illustrating the configuration of other printing devices according to the embodiment of the invention.

Namely, FIG. 4A and FIG. 4B illustrate the configuration of a film 20 in other printing devices 115 and 116 according to the embodiment, illustrating schematic plane views seen from a direction corresponding to the arrow C in FIG. 1C.

As illustrated in FIG. 4A, in the printing device 115, the film 20 is provided with two first recesses, that is, a first recess 21a and a first recess 21b. A second recess 22a is provided on the bottom face of the first recess 21a, and a second recess 22b is provided on the bottom face of the first recess 21b. As described above, the film 20 can be provided with a plurality of first recesses (for example, the first recess 21a and the first recess 21b), and each of a plurality of first recesses can be provided with a second recess.

As illustrated in FIG. 4B, in the printing device 116, the film 20 is provided with a single first recess 21, and two second recesses, that is, a second recesses 22a and a second recess 22b provided on the bottom face of the first recess 21. As described above, a plurality of second recesses (for example, the second recesses 22a and the second recess 22b) can be provided on the bottom face of the single first recess 21.

In the printing devices 115 and 116, acoustic wave focusing regions 18a and 18b are disposed as corresponding to the positions of the second recesses 22a and 22b, for example. Namely, in this case, an acoustic head 10, for example, has a plurality of acoustic elements 11e arranged along the Y-axis direction. Thus, a plurality of acoustic wave focusing regions (the acoustic wave focusing regions 18a and 18b) can be formed. As described above, the plurality of acoustic elements 11e are provided and the plurality of acoustic wave focusing regions 18 are formed, so that the efficiency of the ejection of a dispersed body 30 is improved, and the efficiency of printing is improved.

In the printing devices 115 and 116, both of the first recess and the second recess have a belt shape extending along the X-axis direction. However, as explained as to the printing device 112 to 114, such a configuration may be possible in which at least one of the first recess and the second recess is discretely provided and pluralities of discrete first recesses and second recesses are provided on a first major surface 20a of the film 20.

In a typical ink jet printing device, a problem arises in that nozzles are clogged because of the condensation of ink due to the evaporation or vaporization of a solvent of liquid ink and the ejection of droplets is hindered. However, the aforementioned printing devices according to the embodiment also have a feature in that this problem does not arise because the devices use no nozzles. Particularly, in the applications to the industrial field, a dispersed body containing various solid particles is often used. Thus, this feature is particularly useful. There are a few restrictions on the dispersed body 30 usable.

Since the film 20 is used to supply the solid particles 31 and the liquid 32 to be the dispersed body 30, there are features in that an ink layer having a smooth thickness can be formed and the accuracy of adjusting the position of the acoustic head 10 to the film 20 is relaxed.

As described above, an embodiment of the invention is explained with reference to specific examples. However, the invention is not limited to these specific examples. For example, as to the specific configurations of the components such as the acoustic head, the acoustic wave generating unit, the acoustic wave focusing unit, the acoustic wave transmitting unit, the acoustic element, the electrode, the driver, the film, the solid particle layer forming unit, and the liquid layer forming unit constituting the printing device, these specific configurations are included in the scope of the invention as long as a person skilled in the art may appropriately select configurations from the publicly known range to similarly carry out the invention for obtaining the similar effect.

Further, any two or more components of the specific examples may be combined within the extent of technical feasibility and are included in the scope of the invention to the extent that the purport of the invention is included.

Moreover, all printing devices obtainable by an appropriate design modification by a person skilled in the art based on the foregoing printing devices described as an embodiment of the invention are also within the scope of the invention to the extent that the purport of the invention is included.

Various other variations and modifications can be conceived by those skilled in the art within the spirit of the invention, and it is understood that such variations and modifications are also encompassed within the scope of the invention.

INDUSTRIAL APPLICABILITY

According to the invention, there is provided a printing device that can uniformize the amount of solid particles contained in ejected droplets and uniformly make a print in the case of discharging a dispersed body containing solid particles.

REFERENCE SIGNS LIST

7S solid particle layer forming unit
7Sa solid particle supply unit
7Sb solid particle layer uniformizing unit
7L liquid layer forming unit
7La liquid supply unit
7Lb liquid layer uniformizing unit

10 acoustic head
11 acoustic wave generating unit
11a piezoelectric element
11b, 11c electrode
11e acoustic element
12 acoustic wave focusing unit
13 acoustic wave transmitting unit
14 driver
18, 18a, 18b acoustic wave focusing unit
20 film
20a first major surface
20b second major surface
21, 21a, 21b first recess
22, 22a, 22b second recess
30 dispersed body
31 solid particles
31a solid particle layer
32 liquid
32a liquid layer
33 droplet
40 material to be printed
110 to 116 printing device
d1 to d3 depth
w1 to w3 width

The invention claimed is:

1. A printing device configured to eject a dispersed body containing a solid particle and a liquid, comprising:

a film having:

a first major surface; and a second major surface on an opposite side of the first major surface, the first major surface being provided with:

a first recess configured to accommodate the liquid; and a second recess provided on a bottom face of the first recess and configured to accommodate the solid particle, wherein a distance between the first major surface and a bottom face of the second recess, in a direction [perpendicular to a direction] from the second major surface to the first major surface, is longer than a distance between the first major surface and a bottom face of the first recess in said direction; and an acoustic head configured to focus an acoustic wave from a side of the second major surface toward the first recess and the second recess.

2. The printing device according to claim 1, further comprising:

a solid particle layer forming unit configured to dispose the solid particle in the second recess; and a liquid layer forming unit configured to dispose the liquid in the first recess.

3. The printing device according to claim 2, wherein after the solid particle layer forming unit disposes the solid particle in the second recess, the liquid layer forming unit disposes the liquid in the first recess.

4. The printing device according to claim 3, wherein:

a relative position between the film and the acoustic head is changed within a plane parallel to the second major surface; and a width of the second recess along a second direction vertical to a first direction of a change in the relative position is smaller than a width of an acoustic wave focusing region along the second direction, the acoustic wave being focused on the acoustic wave focusing region on the first major surface.

5. The printing device according to claim 4, wherein a width of the first recess along the second direction is larger than the width of the acoustic wave focusing region along the second direction.

* * * * *